United States Patent
Rainey

(10) Patent No.: US 6,382,642 B1
(45) Date of Patent: May 7, 2002

(54) ADJUSTABLE BIN CART

(76) Inventor: Kyle Rainey, 14724 Vinewood Dr., Baton Rouge, LA (US) 70816

( * ) Notice: Subject to any disclaimer, the term of this patent is extended or adjusted under 35 U.S.C. 154(b) by 0 days.

(21) Appl. No.: 09/259,003

(22) Filed: Feb. 26, 1999

Related U.S. Application Data

(60) Provisional application No. 60/076,086, filed on Feb. 26, 1998.

(51) Int. Cl.$^7$ .................................................. B62B 1/04
(52) U.S. Cl. ............................... 280/47.24; 280/47.26; 280/79.5
(58) Field of Search ........................ 280/47.24, 47.26, 280/79.5

(56) References Cited

U.S. PATENT DOCUMENTS

| | | | | |
|---|---|---|---|---|
| 1,363,499 A | * | 12/1920 | Davis | 280/47.26 |
| 1,873,690 A | * | 8/1932 | Ward | 414/690 |
| 2,381,858 A | * | 8/1945 | Austin | 414/445 |
| D143,329 S | * | 12/1945 | Leonard | 280/47.24 |
| 2,514,849 A | * | 7/1950 | Dewing | 280/47.26 |
| 2,683,012 A | * | 7/1954 | Reinsma | 248/129 |
| 2,704,165 A | * | 3/1955 | Hoover | 214/383 |
| 2,802,673 A | * | 8/1957 | Hazlett | 280/47.24 |
| 3,233,764 A | * | 2/1966 | Hlnsch | 280/47.24 |
| 4,113,214 A | * | 9/1978 | Dubois | 248/146 |
| 4,614,350 A | * | 9/1986 | Bunch | 280/47.24 |
| 5,000,467 A | * | 3/1991 | Becca | 280/47.24 |
| 5,160,154 A | | 11/1992 | Seydel | 280/47.19 |
| 5,192,092 A | | 3/1993 | DiBenedetto | 280/654 |
| 5,356,163 A | * | 10/1994 | Suggs, Sr. | 280/47.27 |
| 5,595,395 A | | 1/1997 | Wilson | 280/47.26 |
| D395,110 S | * | 6/1998 | O'Neal et al. | 280/47.24 |
| D395,120 S | * | 6/1998 | Newman et al. | 280/47.24 |
| 5,758,886 A | * | 6/1998 | Mayer | 280/47.26 |
| 5,947,492 A | * | 9/1999 | Hallberg, Sr. | 280/47.24 |
| 6,053,516 A | * | 4/2000 | Ottaway | 280/79.5 |

OTHER PUBLICATIONS

Rainey, Kyle (cart device not having adjustable hook support or support member), Mar. 1996.

* cited by examiner

Primary Examiner—J. J. Swann
Assistant Examiner—James S. McClellan
(74) Attorney, Agent, or Firm—Henry E. Naylor

(57) ABSTRACT

An adjustable cart for holding and transporting various size rectangular bins. The cart has an upper section and a lower section wherein said upper section contains a lip for supporting a rectangular bin. The cart also contains two vertical members spaced a predetermined distance apart and each having a lower section that is curved downwardly and rearwardly. The cart also contains wheels rotatably connected to the two vertical members and a handle connecting the two vertical members and vertically oriented members for supporting the cart.

5 Claims, 5 Drawing Sheets

2

ADJUSTABLE BIN CART

BACKGROUND—CROSS REFERENCE TO RELATED APPLICATIONS

"This application claims the benefit of Provisional Patent Application Ser. No. 60/076,086, filed Feb. 26, 1998."

BACKGROUND—FIELD OF INVENTION

This Invention relates to wheeled hand carts for transporting various size bins, and more specifically to a wheeled hand cart having an adjustable hook support for holding and transporting various size bins, mainly recycle bins.

BACKGROUND—DESCRIPTION OF PRIOR ART

Most city and county governments throughout the U.S. are currently participating in trash recycling programs. Some recycling programs use one recycle bin to hold all trash for recycling while others use separate bins, usually two or three, to separate certain types of trash. There are even various stackable bins which allow for easy separation of recyclable materials. The city or county governments usually provides a particular sized bin or bins, typically rectangular in shape, and having an outer rectangular lip. There are many different sized recycling bins available for the city or county governments to choose from. Each bin differs in height, width, and depth. When the recycle bin or bins are full of trash they can become heavy and difficult for people to lift or carry from the house or apartment to the curb for pickup.

The purpose of the present invention is to provide a durable, lightweight cart for mounting and transporting various sized recycling bins and other containers which contain an outer lip. The present invention is designed so that the bin or bins can be mounted, transported, and dismounted without ever having to touch the bin or bins.

A number of transferring carts are set forth in the prior are in an effort to address the transfer of recycling bins. U.S. Pat. No. 5,192,092 to DiBenedetto (1993) discloses a recycling bin cart having multiple affixed shelves for placement of recycling bins. U.S. Pat. No. 5,160,154 to Seydel (1992) discloses a hand truck having multiple affixed supports or shelves for placement of boxes or bins. U.S. Pat. No. 5,595,395 to Wilson (1997) discloses a cart device having provisions for holding and transporting various sized bins and maintaining the bins horizontal to the ground despite the angular placement of the device.

Each of the above hand carts have three things in common.

(1) they are all designed for storing and transporting more than one bin or multiple bins. Since many of the cities and counties use only one bin, a cart with multiple platforms, shelves, brackets, or provisions is not always best.

(2) their means for supporting each bin is by an affixed platform, shelf, bracket, or provision. This means that each of the above carts is limited to what size bins it can accommodate. Some of the common recycle bins in use today may not fit on the affixed platform, shelf, bracket, or provision.

(3) a person has to physically pick up each bin and place it on a type of platform, shelf, bracket, or provision. If a person has to lift each full bin and place it onto the cart, they can still injure their back and even stain their clothes. Also, many people are not strong enough to lift a heavy bin and place it on the cart.

Thus, what is needed in the art is a device capable of storing and transporting one bin, multiple bins, or stackable bins without having to physically lift each bin onto a platform, shelf, bracket, or provision.

OBJECTS AND ADVANTAGES

Accordingly, several objects and advantages of my invention are:

(1) to provide a cart which is designed for storing and transporting one bin or multiple bins.

(2) to provide a cart that contains an adjusting hook support to accommodate different sized bins.

(2a) to provide a cart with an adjusting hook support to store and transport all kinds of recycling bins as well as other lipped containers such as: totes, laundry baskets, certain household trash cans and more.

(3) to provide a cart which eliminates bending, lifting, back pain, and stained clothing associated with physically picking up a recycle bin.

(3a) to provide a cart that a person can use to attach, transport, and detach their bin or bins without ever touching the bin(s) itself.

(4) to provide a cart that is compact, lightweight, and easy to use.

Further objects and advantages of my invention will become apparent from a consideration of the drawings and ensuing description.

BRIEF DESCRIPTION OF THE DRAWINGS

In the drawings, closely related figures have the:same number but different alphabetic suffixes.

DETAILED DESCRIPTION OF THE INVENTION

Figure 1:
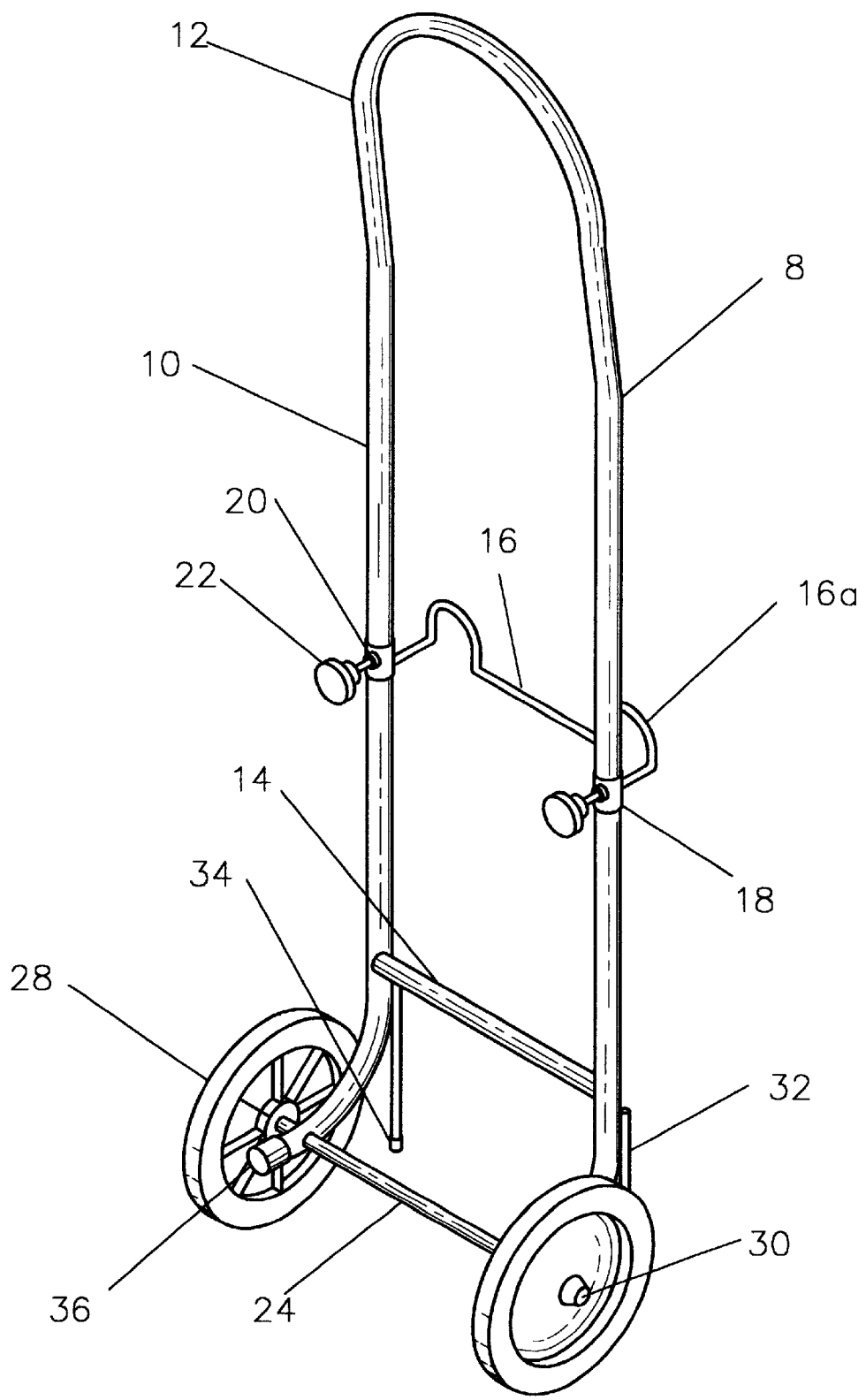
FIG. 1 shows a perspective rear view of the present invention.
Figure 2:
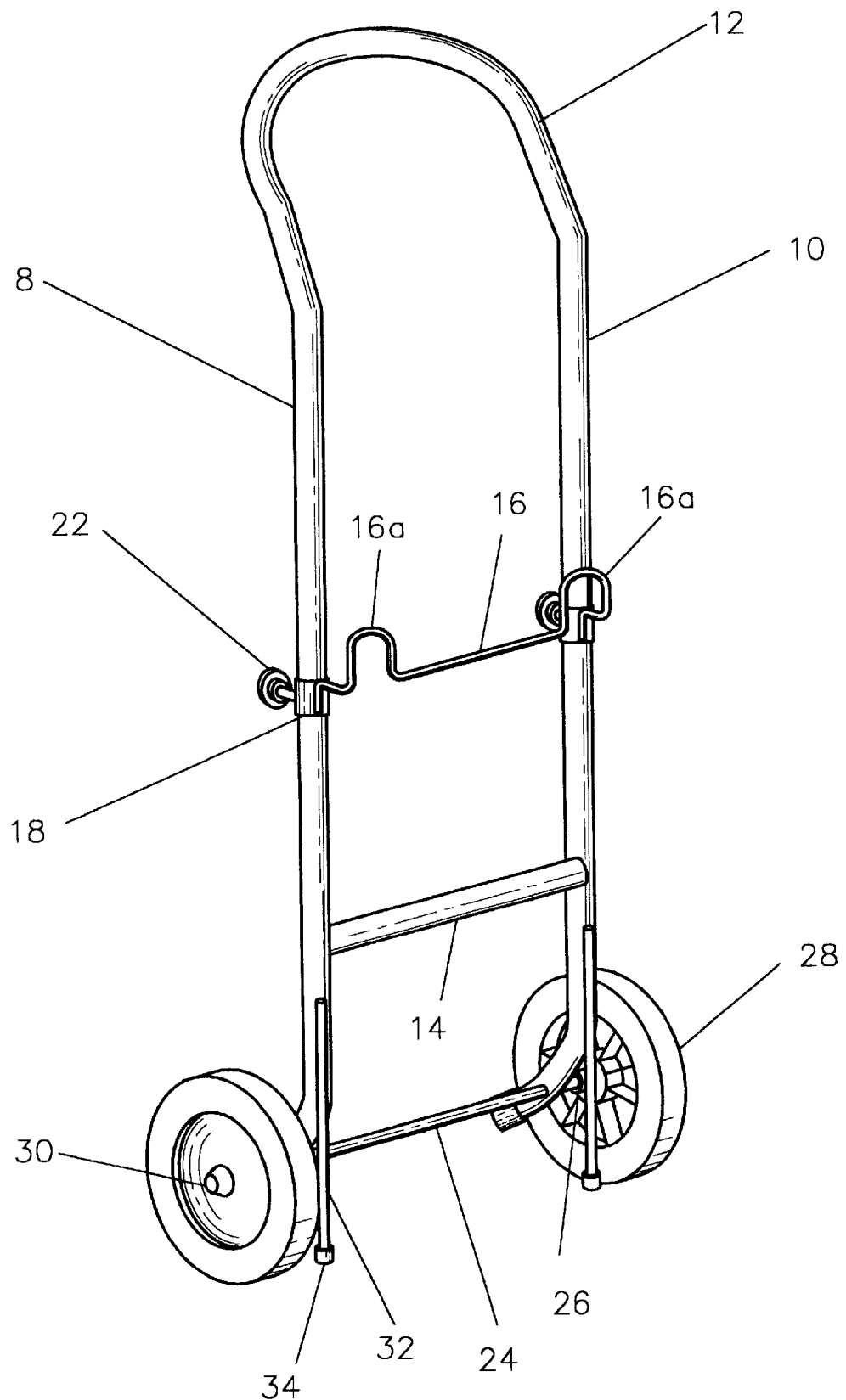
FIG. 2 shows a perspective front view of the present invention.
Figure 3A:
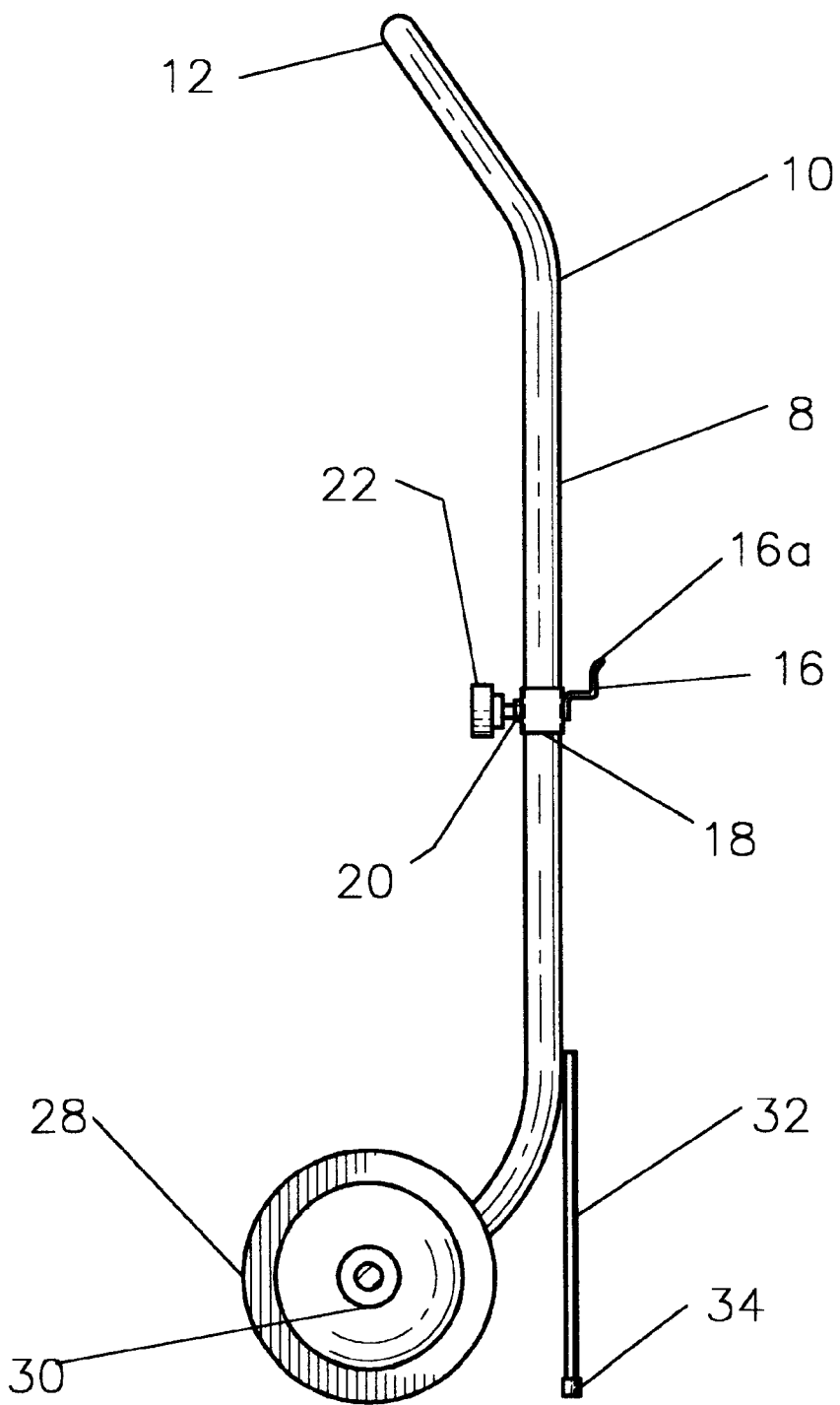
FIG. 3A shows a side view of the present invention.
Figure 3C:
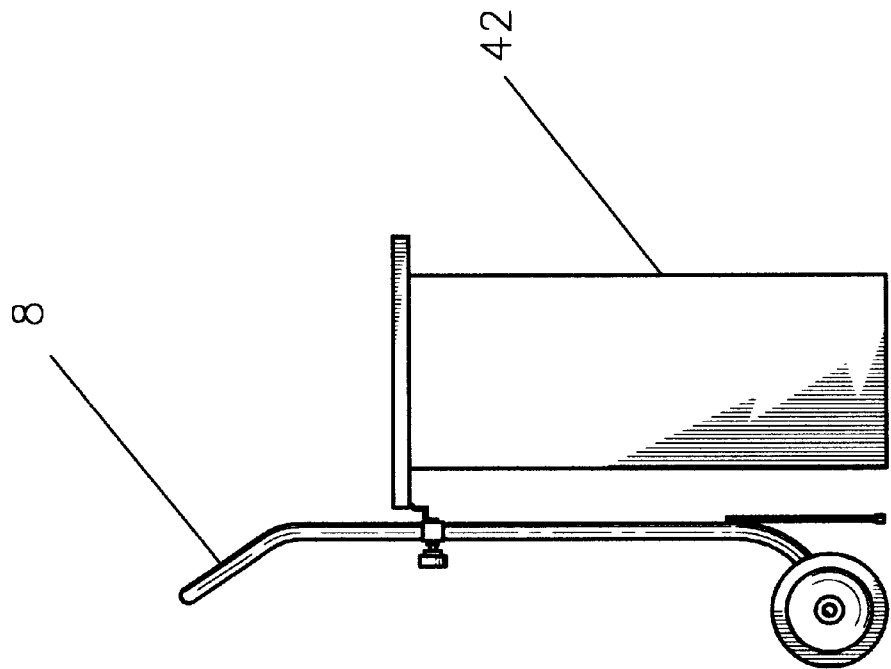
FIG. 3C shows a side view of the present invention shown in FIG. 3A with a tall bin secured to the hook support.
Figure 3B:
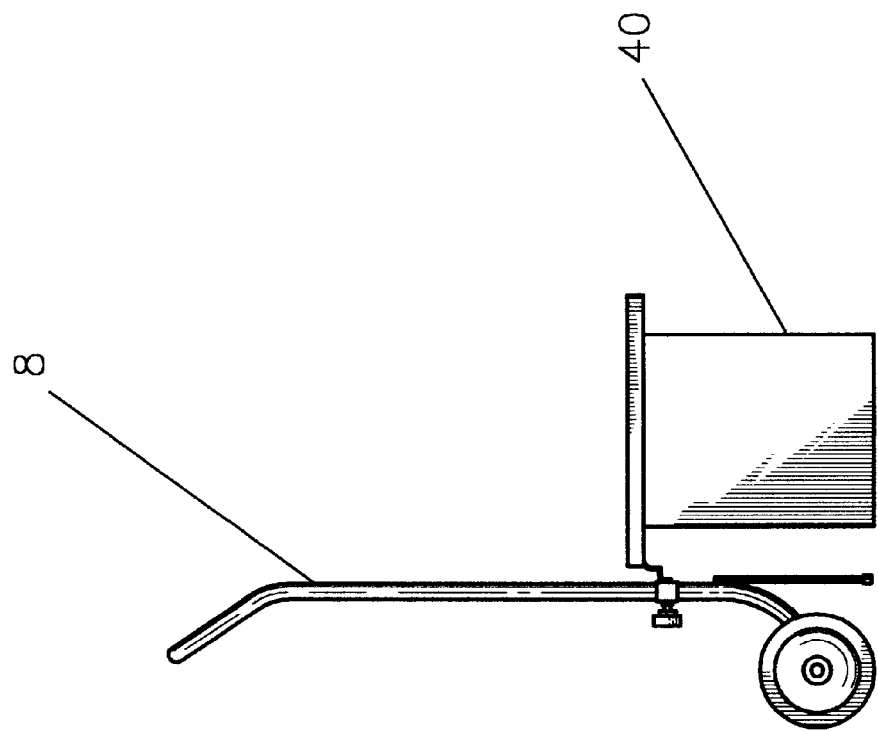
FIG. 3B shows a side view of the present invention shown in FIG. 3A with a short bin secured to the hook support.
Figure 3E:
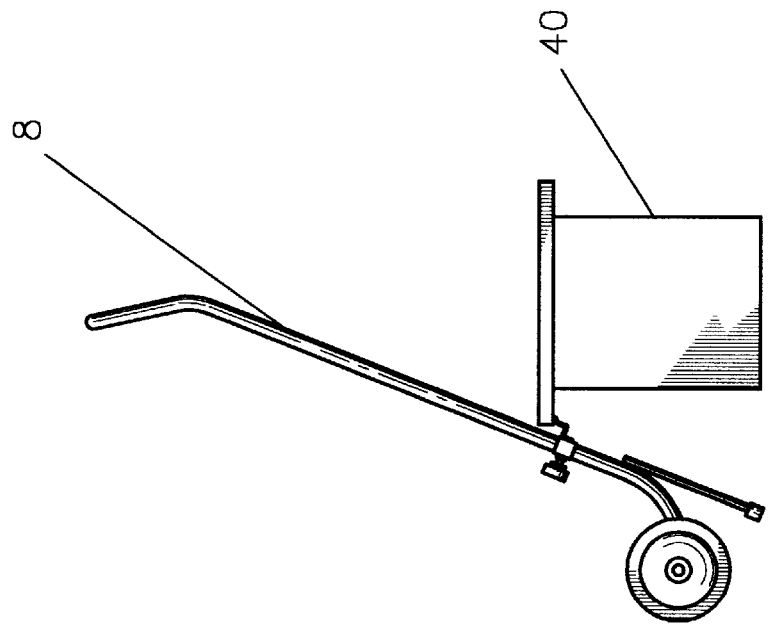
FIG. 3E shows a side view of the short bin shown in FIG. 3B being attached to the hook support on the present invention shown in FIG. 3A.
Figure 3D:
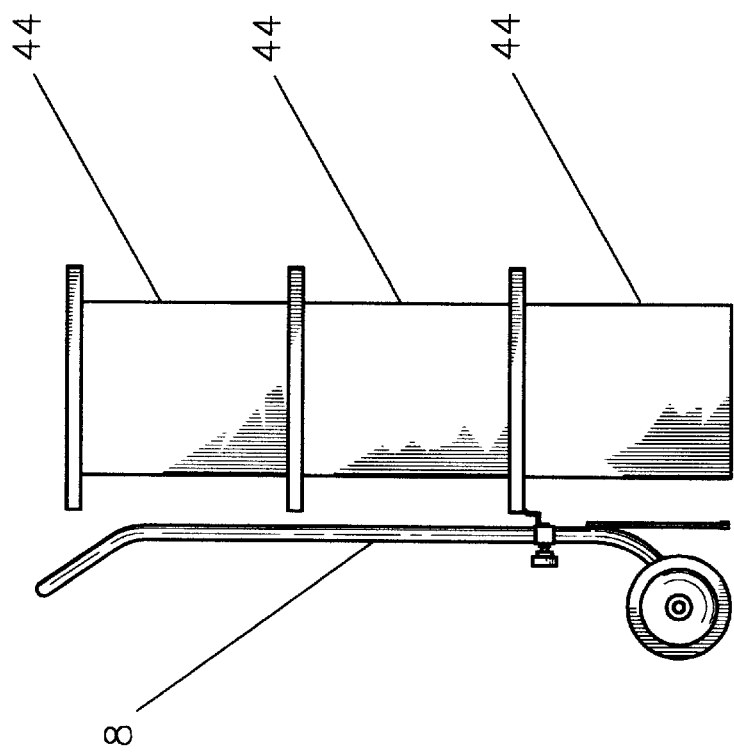
FIG. 3D shows a side view of the present invention shown in FIG. 3A with three stackable bins with the bottom bin being secured to the hook support.

In accordance with the present invention a cart device comprising of an upright member having at least one moveably positioned support, at least one wheel, and at least one vertical support member.

Accordingly, the reader will see that the adjustable hook support on this invention can be used to easily attach, hold, and detach various sized bins. This invention is very versatile and can be used to store and transport many different size bins. Furthermore, the adjustable bin cart has the additional advantages in that it permits the storing of one bin or multiple bins.

it contains an moveable hook support which can be adjusted along the main frame to accommodate different sized bins.

it provides the storage and transport of all kinds of bins which contain an outer upper lip, such as: recycling bins, totes, laundry baskets, certain household trash cans, etc.

it eliminates bending, lifting, and back pain. It also eliminates stained clothing associated with physically picking up a recycle bin.

it is compact, lightweight, easy to use and easy to store when not in use.

The present invention should not be limited to the particular form shown. The present invention has a double vertical member, including a first vertical member 10 and a second vertical member 8, having a handle 12 at one end and an axle 24 bearing two wheels 28 on the distal end. A hook (bin) support 16 is moveably positioned on the vertical members. The hook support 16 is made up of a bar containing two inverted U-shaped hooks 16a which hook support extends from vertical member to the second vertical member. The hook support 16 is joined to two outer sliding cylinders 18 which can be adjusted vertically on the vertical members and secured into place by tightening each of the two bolts 22. Each of the two threaded bolts extend through a threaded nut 20 which is joined to the outer sliding cylinder. By tightening each bolt the bolts will pass through the outer sliding cylinder until they touch and clamp onto the vertical members. The present invention also has two support members 32 which extend from the vertical member to the surface from which the present invention is placed. The support members 32 keep the present invention in an upright position. There is a brace 14 which is attached horizontally between the vertical members. The brace 14 is optional, but the use of brace 14 adds strength to the present invention and keeps the hook support from moving too close to the bottom of the vertical members.

Although the description above contains many specifications, these should not be construed as limiting the scope of the invention but as merely providing illustrations of some of the presently preferred embodiments of this invention. For example, below are several other modes for carry out the invention:

(1) The present invention could also be made by having more than one moveable support positioned on the upright member. The reason for having more than one moveable support would be for use with multiple or stackable bins. The person would have to physically lift the bin or bins that would be supported by a second or third moveable support.

(2) The present invention could also be made by using a telescoping upright member. The hook support would be affixed to the upright member or handle, but because the upright member or handle is telescoping the hook support would still be moveable along the upright member or handle.

(3) The present invention could also be made by having holes spaced out along the upright member in which the hook support would be inserted into the designated hole. The hook support would be moveable along the upright member by simply inserting the hook support into a different hole.

(4) The present invention could also be made by using a C-Clamp device for the hook support. The C-Clamp hook support would slide up and down the member and be secured to the upright member by tightening a knob.

Thus the scope of the invention should be determined by the appended claims and their legal equivalents, rather than by the examples given.

What is claimed is:

1. A cart for holding and transporting various size rectangular bins said bins having an upper section and a lower section wherein said upper section contains a lip, said cart comprising; an upright member having a first vertical member and a second vertical member which vertical members are spaced a predetermined distance apart and wherein said first and second vertical members each have a lower section that is curved downwardly and rearwardly;

a handle connecting said first vertical member to said second vertical member;

a bin-support slidably and selectively positioned on both of said first vertical member and said second vertical member and selectively connected to both of said first and second vertical members, said bin-support having at least one structure for engaging said lip of said bin, wherein said at least one structure for engaging said lip is positioned between said first and second vertical members;

a first wheel rotatably connected to said lower section of said first vertical member;

a second wheel rotatably connected to said lower section of said second vertical member; and wherein each of said vertical members has a vertically oriented support member attached thereto at its bottom section adjacent to said lower section and extending to the ground when said cart is in an upright position and wherein said vertically oriented support member is located at a position between a vertical plane drawn through said bin-support and a vertical plane drawn through a section of said wheel attached to said lower section of said vertical member.

2. The cart according to claim 1 wherein said structure for engaging said lip contains at least one inverted U-shaped hook.

3. The cart of claim 1 wherein there is provided two or more structures for engaging said lip which two or more structures are a predetermined distance apart.

4. The cart according to claim 1 further comprising a second bin-support on both of said vertical members, said second bin-support member having a structure for engaging a lip of a second bin.

5. The cart of claim 1 wherein said lower section of said first and second vertical members are integral one piece with said respective first and second vertical members.

* * * * *